United States Patent
Xia (10) Patent No.: US 12,397,500 B2
(45) Date of Patent: Aug. 26, 2025

(54) SYSTEM AND METHOD OF LOW-WASTE MULTI-MATERIAL RESIN PRINTING

(71) Applicant: BMF Nano Material Technology Co., Ltd, Shenzhen (CN)

(72) Inventor: Chunguang Xia, San Diego, CA (US)

(73) Assignee: BMF Nano Material Technology Co., Ltd, Shenzhen (CN)

(*) Notice: Subject to any disclaimer, the term of this patent is extended or adjusted under 35 U.S.C. 154(b) by 0 days.

(21) Appl. No.: 17/887,337

(22) Filed: Aug. 12, 2022

(65) Prior Publication Data

US 2023/0045800 A1    Feb. 16, 2023

Related U.S. Application Data

(60) Provisional application No. 63/233,102, filed on Aug. 13, 2021.

(51) Int. Cl.
*B29C 64/135* (2017.01)
*B29C 64/209* (2017.01)
(Continued)

(52) U.S. Cl.
CPC .......... *B29C 64/135* (2017.08); *B29C 64/209* (2017.08); *B29C 64/255* (2017.08);
(Continued)

(58) Field of Classification Search
CPC ... B29C 64/255; B29C 64/286; B29C 64/336; B29C 64/357; B33Y 10/00; B33Y 30/00; B33Y 40/00
See application file for complete search history.

(56) References Cited

U.S. PATENT DOCUMENTS

| 4,575,330 A | 3/1986 | Hull |
| 5,192,559 A | 3/1993 | Hull |

(Continued)

FOREIGN PATENT DOCUMENTS

| CN | 102928910 | 2/2013 |
| CN | 104827667 | 8/2015 |

(Continued)

OTHER PUBLICATIONS

"Three-dimensional fabrication of heterogeneous microstructures using soft membrane deformation and optofluidic maskless lithography", Seung Ah Lee, Su Eun Chung, Wook Park, Sung Hoon Lee and Sunghoon Kwon, Lab Chip, 2009, 9, 1670-1675.

(Continued)

*Primary Examiner* — Michael M. Robinson
(74) *Attorney, Agent, or Firm* — Young Basile Hanlon & MacFarlane, P.C.

(57) ABSTRACT

A multi-material 3-D printing system and method including at least two printing heads each with a transparent window circumscribed by an ejection nozzle. Each ejection nozzle is coupled to a respective pump that pumps resin from a respective vat onto a respective window. The resin is cured from below the window by exposure to a digital image displayed by a micro display chip. To switch resins, the sample is moved across a plurality of suction nozzles towards a second printing head. A respective one of the suction heads is coupled to a vacuum that effectuates the intake of residual resin from the underside of the sample.

7 Claims, 6 Drawing Sheets

(51) Int. Cl.
  *B29C 64/255* (2017.01)
  *B29C 64/286* (2017.01)
  *B29C 64/336* (2017.01)
  *B29C 64/357* (2017.01)
  *B33Y 10/00* (2015.01)
  *B33Y 30/00* (2015.01)
  *B33Y 40/00* (2020.01)

(52) U.S. Cl.
  CPC .......... *B29C 64/286* (2017.08); *B29C 64/336* (2017.08); *B29C 64/357* (2017.08); *B33Y 10/00* (2014.12); *B33Y 30/00* (2014.12); *B33Y 40/00* (2014.12)

(56) References Cited

U.S. PATENT DOCUMENTS

| | | |
|---|---|---|
| 5,933,278 A | 8/1999 | Plummer |
| 6,011,577 A | 1/2000 | Goodman |
| 6,607,689 B1 | 8/2003 | Farnworth |
| 7,892,474 B2 | 2/2011 | Shkolnik |
| 8,487,822 B1 | 7/2013 | Jennings |
| 9,205,601 B2 | 12/2015 | Desimone |
| 9,211,678 B2 | 12/2015 | Desimone |
| 9,216,546 B2 | 12/2015 | Desimone |
| 9,360,757 B2 | 6/2016 | Desimone |
| 9,496,675 B1 | 11/2016 | Plummer |
| 11,654,617 B2 | 5/2023 | Xia et al. |
| 11,654,619 B2 | 5/2023 | Xia |
| 2005/0219400 A1 | 10/2005 | Poulsen |
| 2005/0248061 A1 | 11/2005 | Shkolnik |
| 2008/0174050 A1 | 7/2008 | Kikuchi |
| 2009/0186306 A1 | 7/2009 | Haraldsson |
| 2009/0196946 A1 | 8/2009 | Kihara et al. |
| 2010/0291401 A1 | 11/2010 | Medina |
| 2011/0101569 A1 | 5/2011 | Yasukochi |
| 2011/0260365 A1 | 10/2011 | El-Siblani |
| 2011/0285060 A1* | 11/2011 | Yamamoto ............ B33Y 40/00 425/150 |
| 2013/0021217 A1 | 1/2013 | Tsai |
| 2013/0295212 A1 | 11/2013 | Chen |
| 2015/0001763 A1 | 1/2015 | Elsey |
| 2015/0247679 A1 | 9/2015 | Niimi |
| 2017/0274586 A1 | 9/2017 | Hakkaku |
| 2017/0334142 A1 | 11/2017 | Baldeck |
| 2017/0355132 A1* | 12/2017 | Moore ................... B29C 35/02 |
| 2018/0056587 A1 | 3/2018 | Arai |
| 2018/0056590 A1 | 3/2018 | Costabeber |
| 2018/0194064 A1 | 7/2018 | Chen |
| 2018/0200964 A1 | 7/2018 | Rockstroh |
| 2019/0022947 A1 | 1/2019 | Ho et al. |
| 2019/0111622 A1 | 4/2019 | Khalip |
| 2020/0061917 A1* | 2/2020 | Osborn ................. B33Y 30/00 |
| 2020/0101665 A1 | 4/2020 | Beets |
| 2020/0108465 A1 | 4/2020 | Sweetland |
| 2021/0237345 A1 | 8/2021 | Xia et al. |
| 2021/0276249 A1 | 9/2021 | Xia |
| 2021/0331380 A1 | 10/2021 | Seo |
| 2022/0048254 A1 | 2/2022 | Xia |
| 2023/0398739 A1 | 12/2023 | Xia et al. |
| 2024/0157642 A1* | 5/2024 | Korten ................. B33Y 30/00 |
| 2024/0198587 A1 | 6/2024 | Xia |

FOREIGN PATENT DOCUMENTS

| | | |
|---|---|---|
| CN | 104991353 | 10/2015 |
| CN | 105390056 | 3/2016 |
| CN | 206718470 | 12/2017 |
| CN | 107756814 | 3/2018 |
| CN | 107756814 A | 3/2018 |
| CN | 108437448 | 8/2018 |
| CN | 108437448 A | 8/2018 |
| CN | 109466061 | 3/2019 |
| CN | 109483872 | 3/2019 |
| CN | 109483872 A | 3/2019 |
| CN | 111873431 | 11/2020 |
| CN | 111873433 | 11/2020 |
| CN | 112549537 | 3/2021 |
| CN | 113927897 | 1/2022 |
| EP | 1732746 B1 | 4/2011 |
| EP | 3107703 B1 | 4/2020 |
| EP | 4232262 A1 | 8/2023 |
| EP | 3894184 B1 | 1/2024 |
| EP | 4326529 A1 | 2/2024 |
| EP | 4384379 A1 | 6/2024 |
| JP | H07329188 A | 12/1995 |
| JP | 2004314406 | 11/2004 |
| JP | 2005219400 A | 8/2005 |
| JP | 2009083240 | 4/2009 |
| TW | I568571 B | 2/2017 |
| WO | 2008069564 | 6/2008 |
| WO | 2009042671 | 4/2009 |
| WO | 2012051598 | 4/2012 |
| WO | 2014042486 | 3/2014 |
| WO | 2016115095 | 7/2016 |
| WO | 2017157851 | 9/2017 |
| WO | 2019014098 A1 | 1/2019 |
| WO | 2020181620 | 9/2020 |
| WO | 2021056720 | 4/2021 |
| WO | 2021103502 | 6/2021 |
| WO | 2021165878 A1 | 8/2021 |

OTHER PUBLICATIONS

B. J. Lei, et al., "A wideband, pressure-driven, liquid-tunable frequency selective surface," IEEE Microwave Wireless Components Letters, vol. 21, No. 9, pp. 465-467, 2011.

Jingi Wang et al., "Liquid metal-based plasmonics" Optics Express, vol. 20, No. 2, p. 2346-2353, Jan. 2012.

K. Ikuta and K. Hirowatari, "Real three dimensional micro fabrication using stereo lithography and metal molding," 6th IEEE Workshop on Micro Electrical Mechanical Systems, 1993.

S. Maruo and K. Ikuta, "Three-dimensional microfabrication by use of single-photon-absorbed polymerization," Appl. Phys. Lett., vol. 76, 2000.

S. Maruo and S. Kawata, "Two-Photon-Absorbed Near-Infrared Photopolymerization for Three dimensional Microfabrication," J. MEMS, vol. 7, pp. 411, 1998.

S. Kawata, H. B. Sun, T. Tanaka and K. Takada, "Finer features for functional microdevices," Nature, vol. 412, pp. 697, 2001.

Bertsch et al., "Microstereophotolithography using a liquid crystal display as dynamic mask-generator", Microsystem Technologies, p. 42-47, 1997.

Beluze et al., "Microstereolithography: a new process to build complex 3D objects, Symposium on Design, Test and microfabrication of MEMs/MOEMSs", Proceedings of SPIE, v3680, n2, p. 808-817, 1999.

Kowsari, et al., "High-efficiency high-resolution multimaterial fabrication for digital light processing-based three-dimensional printing," 3D Printing and Additive Manufacturing 5(3):185-193, 2018.

Han et al., "Rapid multi-material 3D printing with projection micro-stereolithography using dynamic fluidic control," Additive Manufacturing 27(11):606-615, 2019.

T. Takagi and N. Nakajima, 4th International Symposium on Micro Machine and Human Science, 1993.

S. Maruo, O. Nakamura and S. Kawata, "Three-dimensional microfabrication with two-photon-absorbed photopolymerization," Optics Letters, vol. 22, pp. 132, 1997.

S. Maruo and K. Ikuta, "Movable microstructures made by two-photon three-dimensional microfabrication," in Proceedings of 1999 International Symposium on Micromechatronics and Human Science, 1999, pp. 173-178.

Arnaud Bertsch, Sébastien Jiguet, Paul Bernhard and Philippe Renaud, "Microstereolithography: a Review," Materials research society symposium proceedings, vol. 758, 2003, p. 3-15.

Notice of Allowance dated Jan. 31, 2025 for U.S. Appl. No. 17/312,173.

Panasonic ("Micro Laser Distance Sensor," in public at least in Apr. 2014, available at https://www.farnell.com/datasheets/1863584.pdf). (Year: 2014).

(56) References Cited

OTHER PUBLICATIONS

International Search Report and Written Opinion for PCT Patent Application No. PCT/IB2023/051584, 10 pages.
International Search Report and Written Opinion for PCT Patent Application No. PCT/IB2021/059731 dated Feb. 28, 2022.
International Search Report and Written Opinion for PCT Patent Application No. PCT/IB2022/053395 dated Jun. 27, 2022, 12 pages.
International Search Report and Written Opinion for PCT Patent Application No. PCT/IB2021/059731 dated Feb. 28, 2022, 22 pages.
International Search Report and Written Opinion for PCT Patent Application No. PCT/IB2022/057569 dated Nov. 8, 2022, 16 pages.
Non-Final Office Action for U.S. Appl. No. 18/033,405 dated Jan. 3, 2025.

* cited by examiner

FIG. 4C Array exposure

FIG. 4B Stitching exposure

FIG. 4A Single exposure

SYSTEM AND METHOD OF LOW-WASTE MULTI-MATERIAL RESIN PRINTING

FIELD

The present disclosure relates to additive manufacturing, and more particularly, to systems and methods for high-resolution 3-D printing over a large area while using multiple printing materials.

BACKGROUND

Stereolithography was originally conceived as a rapid prototyping technology used to create true-scale models of production components directly from computer aided design (CAD) in a rapid (faster than before) manner. Since its conception, and through its disclosure in U.S. Pat. No. 4,575,330, stereolithography has greatly aided engineers and designers in visualizing complex three-dimensional part geometries, detecting errors in prototype schematics, testing critical components, and verifying theoretical designs at relatively low costs and improved time frames.

During the past decades, continuous improvements in the field of micro-electromechanical systems (MEMS) have led to the emergence of micro-stereolithography (μSL), which inherits basic principles from traditional stereolithography but with much higher spatial resolution. See, e.g., Ikuta et al., "Real three dimensional micro fabrication using stereo lithography and metal molding," Proceedings of MEMS '93, 6th IEEE Workshop on Micro Electro Mechanical Systems, San Diego, CA, Jan. 25-28, 1993, pp. 42-47.

The resolution of μSL was improved with the development of single-photon polymerization and two-photon polymerization techniques to achieve printed features of less than 200 nm. See, e.g., Maruo et al., "Three-dimensional microfabrication by use of single-photon-absorbed polymerization," Applied Physics Letters 76(19):2656-2658, 2000; Maruo et al., "Two-photon-absorbed near-infrared photopolymerization for three-dimensional microfabrication," Journal of Microelectromechanical Systems 7(4):411-415, 1998; and Kawata et al., "Finer features for functional microdevices—micromachines can be created with higher resolution using two-photon absorption" Nature 412(6848):697-698, 2001.

The speed of μSL was dramatically increased with the development of projection micro-stereolithography (PμSL). See, e.g., Bertsch et al., "Microstereolithography using liquid crystal display as dynamic mask-generator," Microsystem Technologies, 3(2):42-47, 1997; and Beluze et al., "Microstereolithography: A New Process to Build Complex 3D Objections, Symposium on Design, Test and Microfabrication of MEMs/MOEMs," Proceedings of SPIE 3680(2): 808-817, 1999. The core of this technology is a high resolution spatial light modulator, which is either a liquid crystal display (LCD) panel or a digital light processing (DLP) panel, each of which are available from micro-display industries.

The display size of a DLP chip is currently limited to about 13×13 mm. Therefore, when the projected pixel size is same as the physical pixel size (e.g., 5×5 μm to 8×8 μm), a single-exposure area is limited to 13×13 mm. To print a larger area with single exposure, the size of the projected pixels must be increased. However, this reduces the printing resolution and may therefore be undesirable.

In some cases it is desirable to print individual models from multiple materials, for example from materials having different optical, mechanical, electrical, or chemical properties. PμSL printing materials comprise light-curable resins and composites. The terms "resin," "material," and "printing material" may be used interchangeably herein.

Multi-material printing via PμSL can be problematic because switching materials during PμSL processes can add significant delays. To overcome some of these delays, methods like coat-then-jet-clean and print-then-flush were developed. See, e.g., respectively, Kowsari, et al., "High-efficiency high-resolution multimaterial fabrication for digital light processing-based three-dimensional printing," 3D Printing and Additive Manufacturing 5(3):185-193, 2018; and Han et al., "Rapid multi-material 3D printing with projection micro-stereolithography using dynamic fluidic control," Additive Manufacturing 27(11):606-615, 2019. However, issues with air bubbles and excessive consumption of resin have hindered widespread adoption of these methods.

During PμSL printing, a resin layer is defined between a vat (or reservoir) of resin and the sample stage. A "sample" may refer to the 3-D model as it is being printed layer by layer, and a "sample stage" may refer to the most recently printed layer of the sample. There are generally three methods for defining the resin layer in PμSL. The first method uses a free surface where the layer thickness is defined by a distance between the resin's free surface and a sample stage. However, with this method it may take more than a half an hour to define a 10 μm thick resin layer having a viscosity of 50 cP. This is because of the slow viscous motion of resins. The second and third methods for defining the resin layer in PμSL use a transparent membrane or a hard window, respectively. However, with these methods there is currently no good way to define a 10 μm thick (or thinner) resin layer over an area of 5×5 cm (or larger). Thus, while these methods may enable defining a resin layer faster than the free-surface method, they remain impractically slow. Additionally, during hard-window PμSL printing, the fluidic dynamic force created as the sample approaches the window to define the thin resin layer before exposure (or during separation from the window after exposure) may be strong enough to damage the sample.

The disclosed embodiments solve several of the above-described problems and other problems in the prior art.

SUMMARY

The several embodiments provide for fast and precise PμSL printing over a large area with a defined print-layer thickness. For example, the print area may be 10×10 cm and the print-layer thickness may be 10 μm. A sample is printed layer-by-layer, where the printing of a given layer may be referred to as a "scan" whether it is printed in one or more exposures. In some embodiments there may be two or more printing heads each immersed in and covered by a respective printing material (e.g., a respective resin). The resin-coated printing heads may be utilized in sequentially in alternation to print a multi-material sample.

A printing head may be frustoconical and comprise an optically transparent flat tip at its narrow end. The tip may comprise gas permeable materials, including oxygen-permeable materials such as Polydimethylsiloxane (PDMS) and Teflon AF (from DuPont). The tip may be as large as (or larger than) the exposure area of a DLP chip or it may be a fraction thereof.

There may be at least one printing head for each different printing material (e.g., for each different resin). Each printing head may be disposed within a vat of its assigned resin, under the free surface of the resin by approximately 1-3 mm.

During a scan, a lens projects an image onto a selected one of the printing heads. In some embodiments the lens is disposed gravitationally below the printing head. The lens focuses an image upwards to the transparent flat tip of the printing head to optically expose the resin that is disposed between the tip and the bottom of the sample. The exposed resin cures to form at least a portion of a newly added layer of cured material to the underside of the sample. In some embodiments the entire tip comprises a transparent window and in other embodiments only a portion of the tip comprises a transparent window.

In some embodiments there may be a plurality of lenses, for example one lens for each of a plurality of printing heads. In these embodiments, the image projected through each lens may be gated by a shutter to prevent the image from reaching any non-selected printing heads during a given exposure. A shutter may optically precede the lens or it may optically follow the lens, i.e., the shutter may be positioned at the input or output of the lens, respectively.

In some embodiments each printing head is surrounded by a ring-shaped ejection nozzle. The nozzle is connected to a liquid pump that pumps resin from a reservoir to the tip of the printing head. The flow of resin from the nozzle pushes the free surface of the resin above the tip by approximately 1-3 mm to form a pool of resin above the tip. This fountain-like design enables the tip and/or the pool of resin to be elevated above the free surface of the resin within the vat (or conversely, the free surface of the resin within the vat may be lower than the tip and/or the pool of resin). A lower level of resin in the vat (lower free surface) means that less resin may be present in the vat during the printing process, which may result in less wasted resin. To be clear, the fountain-like design enables subsequent layers of a sample to be printed without the entire bottom surface of the sample being in contact with the free surface of the resin within the vat.

In some embodiments there may be two parallel suction nozzles disposed between two vats of resin, where a first suction nozzle is closer to a first vat of first resin and a second suction nozzle is closer to a second vat of second resin. Each suction nozzle may have a gas-flow velocity of approximately 1-10 m/s driven by a vacuum of approximately 0.2-1.0 atm of pressure difference. When a sample translates from the first vat of a first resin to the second vat of a second resin, the wet bottom surface of the sample moves past (slides above) the suction nozzles by approximately 0.5-1.0 mm, causing any residual uncured (liquid) first resin to be sucked into and collected by the first suction nozzle. The collected first resin may be pumped back to the designated printing head to be used for printing a subsequent layer of the sample. When the sample translates in the reverse direction, the wet bottom surface of the sample again slides above the suction nozzles and any residual uncured (liquid) second resin is sucked into and collected by the second suction nozzle. Embodiments that use three or more resins may comprise three or more suction nozzles that collect residual resin in a similar manner.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings.

DETAILED DESCRIPTION

The present disclosure may be understood more readily by reference to the following detailed description of the disclosure taken in connection with the accompanying drawing figures, which form a part of this disclosure. It is to be understood that this disclosure is not limited to the specific devices, methods, conditions, or parameters described and/or shown herein, and that the terminology used herein is for the purpose of describing particular embodiments by way of example only and is not intended to be limiting of the claimed disclosure. Also, as used in the specification and including the appended claims, the singular forms "a," "an," and "the" include the plural, and reference to a particular numerical value includes at least that particular value, unless the context clearly dictates otherwise.

The following numerals are used to describe various features of the embodiments.

Figure 1:
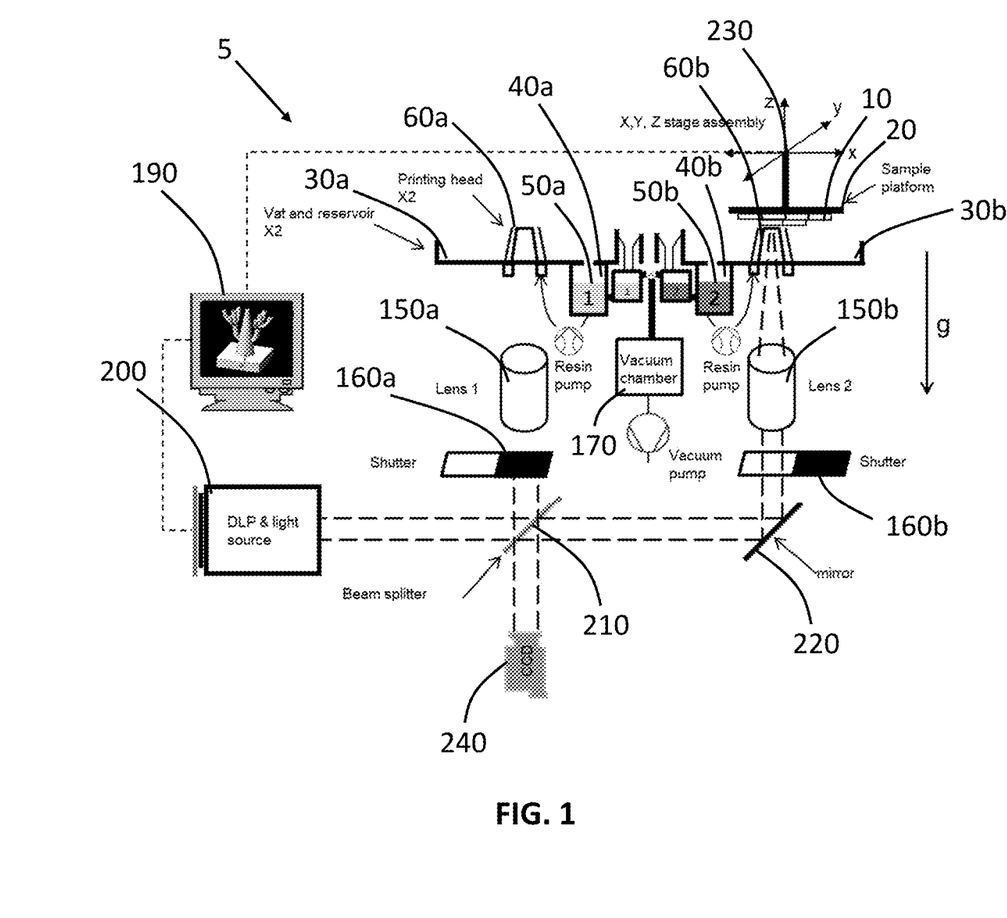
FIG. 1 shows a schematic of a low-waste multi-material PμSL system.

5 printing apparatus
10 sample
20 sample platform
30a,b first and second vat
40a,b first and second storage reservoir
50a,b first and second resin
60a,b first and second printing head
70a,b first and second tip
80a,b first and second gas-permeable window
90a,b first and second ring-shaped nozzle
100a,b first and second resin pool
110a,b first and second liquid pump
120a,b first and second suction nozzle
130a,b first and second suction reservoir
140a,b first and second valves
150a,b first and second lens
160a,b first and second shutter
170 vacuum chamber
180 manifold
190 computer
200 DLP and light source
210 beam splitter
220 mirror
230 XYZ stage assembly
240 charge-coupled device (CCD)
250a,b first and second tall blade
260a,b first and second short blade FIG. 1 shows an embodiment of a multi-material resin printing apparatus 5 for printing a 3-D sample 10 on the underside of a sample platform 20. The sample platform 20 may be coupled to a precision XYZ stage assembly 230 that can move the sample platform 20 laterally in the X and Y directions and vertically in the Z direction relative to each of a first printing head 60a and a second printing head 60b (e.g., three precision stages adapted to move the sample 10, affixed to a sample platform 20). In some embodiments, relative motion between the printing heads 60 and the sample platform 20 may be enabled by coupling each stage of the XYZ stage assembly 230 to various parts of the printing apparatus 5 such as the printing heads 60.

Each printing head 60 may be disposed in a respective vat 30 and partially or completely submerged in and/or coated by a respective resin 50. Each vat 30 is above and fluidically coupled to a respective storage reservoir 40 such that liquid resin 50 in the vat 30 may drain into the storage reservoir 40 (e.g., each storage reservoir 40 is disposed below a respective vat 30 and fluidically coupled thereto via an orifice). The vat 30 may collect liquid resin 50 as it drips off of a sample 10 during printing.

A multi-material printing process may begin by generating (or otherwise obtaining) a digital 3-D model via a computer 190. The 3-D model may be an assembly of multiple models each representing different materials. The 3-D model may be sliced, or divided, into layers approximately 5-20 μm thick. Each layer may be represented by one or more 2-D digital images, where any given digital image corresponds to a single material. In other words, if a given layer comprises two materials, then there would be at least two digital images for that layer.

A sample 10 may be printed in layers, one at a time, by projecting and focusing a series of optical images onto a selected one of the printing heads 60. To print a given layer, the computer 190 may send a digital image to a DLP and light source 200 where it may be transformed into an optical image (e.g., the DLP is adapted to display a digital image received from the computer 190). The DLP and light source 200 may project the optical image towards a selected one of the printing heads 60, for example, towards a first printing head 60a for printing a first resin 50a or towards a second printing head 60b for printing a second resin 50b. Each printing head 60a or 60b may be selected (or deselected) by opening (or closing) a respective shutter 160a or 160b (e.g., each respective shutter 160a or 160b is adapted to selectively prohibit the digital image from reaching a respective lens 150a or 150b). A lens 150a or 150b may be disposed between each respective shutter 160a or 160b and the respective printing head 60a or 60b to focus the optical image(s) (e.g., the lens 150a or 150b may be disposed below a respective gas-permeable window 80 and adapted to focus the digital image).

In some embodiments the optical image projected by the DLP and light source 200 may encounter a beam splitter 210 that partially reflects the optical image towards the first shutter 160a and partially transmits the optical image therethrough towards a mirror 220 that reflects the optical image towards the second shutter 160b (e.g., the mirror 220 is adapted to reflect the partially transmitted digital image towards the second shutter 160b). In some embodiments a charge coupled device (CCD) 240 may be aligned with an optical axis of the first lens 150a to monitor the projection of the optical image onto the first printing head 60a (e.g., adapted to monitor the projection of the optical image). The CCD 240 may be positioned on a side of the beam splitter 210 opposite the first shutter 160a.

Figure 2:
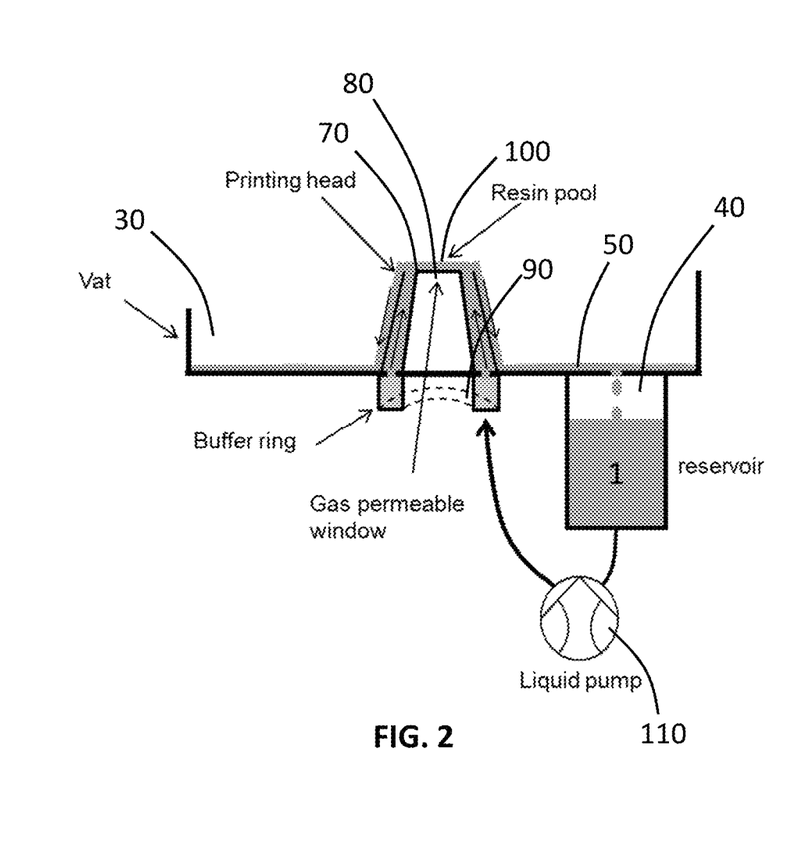
FIG. 2 shows a schematic of a printing head for a PμSL system.

As shown in FIG. 2, a printing head 60 may be frustoconical with a flat tip 70 at the frustum (e.g., the printing head 60 may define an upward-facing frustom). The tip 70 may comprise a transparent gas-permeable window 80 (e.g., a flat, sealed, optically transparent, and gas-permeable window 80) through which an optical image may be transmitted. The gas-permeable window 80 may have lateral dimensions to accommodate an entire optical image projected by the DLP and light source 200. For example, a DLP and light source 200 that utilizes a DLP chip having 1920×1080 resolution with 10×10 μm pixels may project an optical image with a 22 mm diagonal dimension (via Pythagorean's theorem). Thus, a circular gas-permeable window 80 may be chosen to have a diameter of 25 mm.

The gas-permeable window 80 may be referred to as a membrane or a film, and it may be constructed from or coated by any suitable material, preferably those with superior optical clarity such as DuPont Teflon AF2400 or polydimethylsiloxane (PDMS). Gas permeability helps to prevent the gas-permeable window 80 from sticking to resin 50 that cures during photo polymerization due to exposure to an optical image. Oxygen permeability is especially advantageous because oxygen inhibits photo-crosslinking. The gas-permeable window 80 may have a thickness of 130 μm.

Each printing head 60 may be circumscribed by a ring-shaped nozzle 90, e.g., an ejection nozzle having an annular (or polygonal annular) opening, that is fluidically coupled to a respective liquid pump 110 capable of pumping resin 50 from a storage reservoir 40 to the tip 70 of the printing head 60 (e.g., each liquid pump 110 is adapted to pump resin 50 from a storage reservoir 40 to a printing head 60). The ring-shaped nozzle 90 may be frustoconical (or frusto-pyramidal) with an outer wall extending upwards and inwards at an angle of approximately 50 degrees from the horizontal, and the ring-shaped nozzle 90 may have an annular opening adjacent to and circumscribing the tip 70 of the printing head 60 with a gap of approximately 500 μm. Resin 50 may be pumped by the liquid pump 110 into and through the ring-shaped nozzle 90. As the resin 50 exits the annular opening of the ring-shaped nozzle 90, it may flow towards the center of the gas-permeable window 80 due to the inward angle of the outer wall of the ring-shaped nozzle 90, thereby creating a resin pool 100 that covers the top surface of the gas-permeable window 80. The thickness of the resin pool 100 may be controlled by adjusting the flow rate of the liquid pump 110. In some embodiments a thickness of 1-3 mm may be preferred. The liquid pump may be any suitable type, for example a non-contact peristaltic pump or a diaphragm pump, and it may pump at a flow rate of approximately 5-10 ml/s. During printing, excess resin 50 of the resin pool 100 may flow off the tip 70 into a respective vat 30 and reservoir 40. The terms "frustoconical" and "frusto-pyramidal" may be used interchangeably herein, and the terms "annular" and "polygonal annular" may be used interchangeably herein.

An optical image that is focused on a printing head 60 creates a focused image at or adjacent to the gas-permeable window 80, and therefore, at or adjacent to the resin pool 100 coating the top surface of the gas-permeable window 80. The bright areas of the optical image cause the resin 50 of the resin pool 100 to cure, or polymerize, whereas the dark areas of the optical image do not cause curing or polymerization.

Due to size limitations of currently available LCD and DLP chips, a single exposure may not be large enough to print an entire layer (of a given material) of a sample 10. For example, a DLP chip having a pixel resolution of 1920×1080 resolution with 10×10 μm pixels creates an optical image of 19.2×10.8 mm. If a cross-section of the sample 10 is larger than 19.2×10.8 mm, then the corresponding layer must be printed with multiple exposures, i.e., in multiple sections.

In some embodiments multiple-exposure printing may be achieved by dividing a digital image corresponding to an oversized layer into multiple digital sub-images. Each sub-image corresponds to an optical image no larger than the maximum projected image of the DLP or LCD chip at the desired pixel size. For example, a printing apparatus 5 that utilizes a DLP chip having a pixel resolution of 1920×1080 may need to print an oversized layer having a pixel resolution of 3800×2000. In this case, the computer 190 may generate (or otherwise obtain) four digital sub-images for that layer, each having a pixel resolution of 1900×1000. The printing apparatus 5 may then print the oversized layer one section at a time, where each section corresponds to one of the sub-images.

Figure 3A:
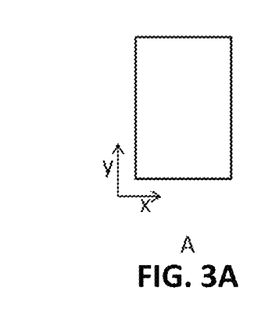
FIGS. 3A-3E show alignments of exposures during stitch printing.
Figure 3B:
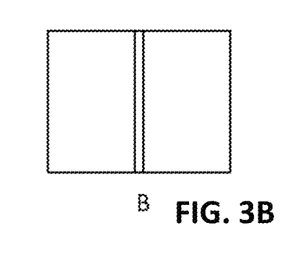
Figure 3C:
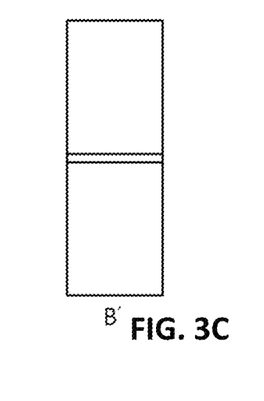
Figure 3D:
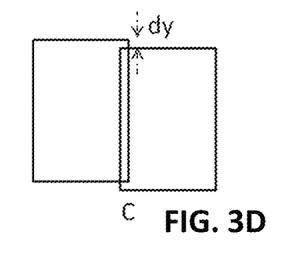
Figure 3E:
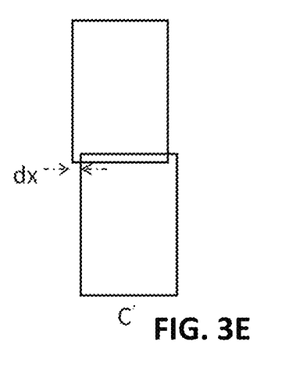

Adjacent edges of neighboring sections may be printed to overlap one another by 5-20 µm, as indicated by FIGS. 3B-3C, to improve mechanical strength of the resulting layer at the section boundaries. The precise positions and amounts of overlap at section boundaries may be accurately controlled by the XY stage of the XYZ stage assembly 230. However, misalignment elsewhere in the printing apparatus 5 may cause errors in overlapping of section boundaries. As indicated in FIG. 1, there are at least two frames of reference for each printing head 60. A first frame of reference corresponds to alignment between the DLP and light source 200 and the printing head 60, and a second frame of reference corresponds to alignment between the printing head 60 and the sample platform 20. If these two frames of reference are misaligned with each other, then errors in overlapping of section boundaries like those shown in FIGS. 3D-3E may result. Specifically, FIG. 3D represents misalignment in the Y direction and FIG. 3E represents misalignment in the X direction.

A typical error requirement for PµSL printing may be 10 µm. However, it is not uncommon for an XY stage to have an offset error that is greater than this amount, and further, the offset may be nonlinear with respect to travel distance. Therefore, to counter misalignment errors during multiple-exposure printing, offsets may be measured at a plurality of points distributed in both the X and Y directions of a maximally sized layer. In some embodiments five or more uniformly distributed points may be measured in a maximally sized, square-shaped layer. The measurements may be fit to a second order (or greater) polynomial that may be used to compensate for the observed nonlinear offsets of the XY stage.

Figure 4A:
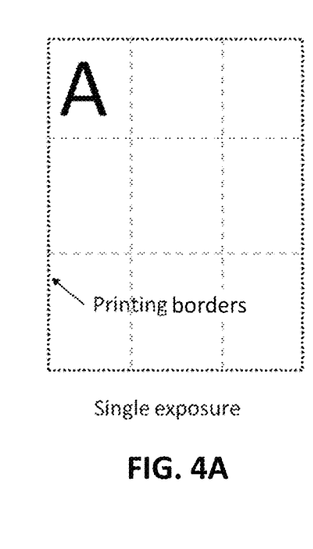
FIGS. 4A-4C show single-, stitch-, and array-exposure printing modes, respectively.
Figure 4B:
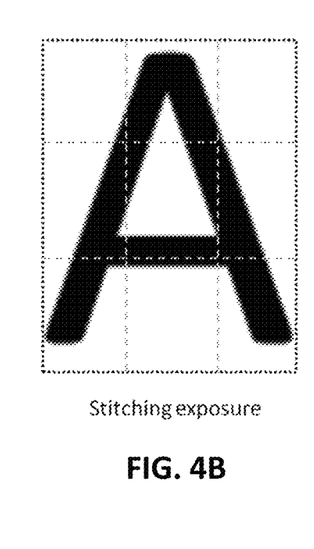
Figure 4C:
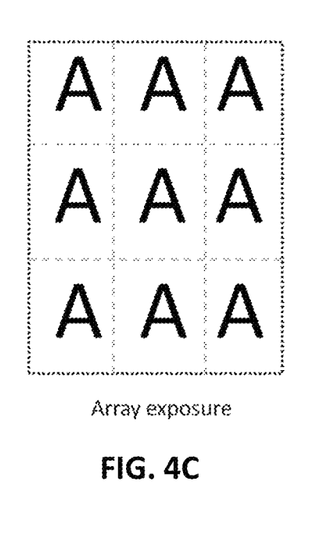

FIGS. 4A-4C shows three printing modes enabled by the XY stage of the XYZ stage assembly 230. In each figure, the maximum layer size is represented by the dotted outer rectangle and the optical-image exposure size is represented by the dashed inner rectangles (nine exposures per layer). FIG. 4A shows "single-exposure" printing, where the printed area fits within a single exposure. In this mode, the XY stages of the XYZ stage assembly 230 do not need to move provided that only one resin 50 is used. FIG. 4B shows "stitch-exposure" printing, where a large image is divided into sub-images each of which is independently printed. In some embodiments each exposure may overlap neighboring exposures by 5-20 µm as described earlier (overlaps are not shown in FIG. 4B). FIG. 4C shows "array-exposure" printing, where the same small image is printed independently multiple times. For low-volume production, array-exposure printing may be faster than single-exposure printing. Array-exposure and stitch-exposure printing may be combined, for example when multiple identical samples need to be printed and each sample has at least one layer that cannot be printed with a single exposure.

For array-exposure and stitch-exposure printing in both X and Y directions, it may be advantageous to laterally size the vat 30 beneath each printing head 60 to be at least four times larger than the maximum size of a printed layer, e.g., at least four times larger than the sample platform 20. This prevents residual resin 50 from dripping from the sample 10 and/or sample platform 20 outside the vat 30. In other words, the vat 30 should be at least twice as long at the sample platform 20 in the X direction and at least twice as long in the Y direction. In some embodiments the printing head 60 may be moved while the sample 10 is kept stationary, and in other embodiments both the sample 10 and the printing head may be moved.

When the printing apparatus 5 finishes printing a first layer, the Z stage of the XYZ stage assembly 230 may move the sample platform 20 (and sample 10) up vertically by at least a layer thickness to define a next layer of liquid resin 50 for printing. However, it may be advantageous to move the sample 10 away from the printing head 60 in the X and/or Y directions (laterally) before moving the sample 10 in the vertical direction. This is because the shear fluid force that results between the printing head 60 and the sample 10 when moving the sample laterally is generally much less than the normal fluid force that results between the printing head 60 and the sample 10 when moving the sample 10 vertically. For example, the vacuum pressure (normal force per unit area) caused by separating two surfaces wetted by resin commonly used in PµSL printing can be described by the following equation: $\sigma = -pI + 2\mu\varepsilon$, where $\sigma$ is the fluid stress tensor, p is the pressure, I is the identity tensor, $\mu$ is the fluid viscosity and $\varepsilon$ is velocity gradient tensor (or fluid strain tensor). A resin viscosity $\mu = 50$ cP and a velocity $\varepsilon = 10$ mm/s yields a vacuum pressure on the order of 1E5 Pa. In contrast, the same two wetted surfaces sliding past each other with a gap of 20 µm yields a shear pressure of 1E2 Pa—approximately three orders of magnitude lower than the normal vacuum pressure. Thus, separating the sample 10 from the printing head 60 laterally instead of vertically helps to prevent damaging or deforming delicate 3-D printed features of the sample 10. As indicated above, the vat 30 should be at least twice as long at the sample platform 20 in the X direction and at least twice as long in the Y direction (for array or stitch printing in both dimensions) to prevent residual resin 50 from dripping from the sample 10 and/or sample platform 20 outside the vat 30.

If the printing apparatus 5 needs to switch between resins 50 during multi-material printing, the XY stage of the XYZ stage assembly 230 may move the sample 10 (on the underside of the sample platform 20) between printing heads 60. However, the underside of the sample 10 may be coated with residual first resin 50a that could drip into a second vat 30b meant only for a second resin 50b. To prevent such cross-contamination, the sample 10 may be moved over (slid across) a first suction nozzle 120a to remove any residual resin 50a Similarly, to prevent cross-contamination in the opposite direction, e.g., when switching from resin 50b to resin 50a, the sample 10 may be moved over a second suction nozzle 120b to remove any residual resin 50b. Indeed, the printing apparatus may include one suction nozzle 120 for each different resin 50.

Figure 5:
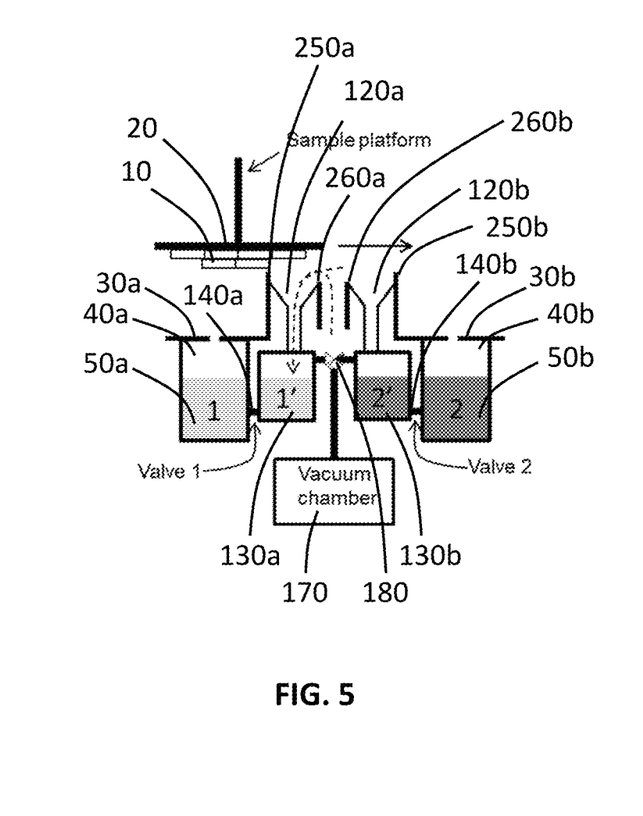
FIG. 5 shows a schematic of a vacuum nozzle between vats of resin.

FIG. 5 shows two suction nozzles 120a and 120b disposed between the first vat 30a and the second vat 30b, where the first suction nozzle 120a may be closer to the first vat 30a and the second suction nozzle 120b may be closer to the second vat 30b. In some embodiments an outer wall of each suction nozzle 120a and 120b may contact or be shared with a respective vat 30a and 30b. Each suction nozzle 120a and 120b may be coupled to a respective suction reservoir 130a and 130b that may in turn be coupled to a vacuum chamber 170 (or any other vacuum source including a vacuum pump) via a manifold 180. Each suction reservoir 130a and 130b may be connected to a respective storage reservoir 40a and 40b via a respective valve 140a and 140b.

Consider the case when the printing apparatus 5 switches from a first resin 50*a* to a second resin 50*b*. As the sample 10 moves away from the first vat 30*a* it encounters the first suction nozzle 120*a*. At this time the first valve 140*a* is closed and the manifold 180 has diverted the vacuum of the vacuum chamber 170 to only the first suction reservoir 130*a*. In so doing, air (or gas) is sucked into the upwards-facing opening of the first suction nozzle 120*a* as indicated by the dashed arrows in FIG. 5. This rapid air intake sucks residual resin 50*a* from the sample 10. As the sample 10 continues to move towards the second vat 30*b*, no resin 50*a* is sucked in by the second suction nozzle 120*b* because there is no vacuum in the second suction reservoir 130*b* (because the manifold 180 has diverted the vacuum to only the first suction reservoir 130*a*). The sample 10 may continue moving until it reaches the second printing head 60*b*. At this time the manifold 180 may divert the vacuum away from the first suction reservoir 120*a* and the first valve 140*a* may be opened to recirculate any captured residual resin 50*a* into the first storage reservoir 50*a*. Now consider the case when the printing apparatus 5 switches back from the second resin 50*b* to the first resin 50*a*. When the sample 10 encounters the second suction nozzle 120*a*, the second valve 140*b* is closed and vacuum has been diverted by the manifold 180 to only the second suction reservoir 130*b*. The second suction nozzle 120*b* therefore sucks residual resin 50*b* from the sample 10 while the first suction nozzle 120*a* does not.

The side walls (or rim) of each suction nozzle 120 may have different heights. Consider the first suction nozzle 120*a*. The wall closer to the vat 30*a* may define a first tall blade 250*a* and the wall further from the vat 30*a* may define a first short blade 260*a*. The first short blade 260*a* allows greater air flow than the first tall blade 250*a* as the sample 10 moves past the first suction nozzle 120*a*. Thus, the dominant flow of air is in a direction towards the first vat 30*a* and away from the second vat 30*b*, e.g., opposite the direction of motion of the sample 10. This helps to prevent resin 50*a* from splashing into or otherwise entering the second suction nozzle 120*b* and thereby contaminating resin 50*b*. In some embodiments a gap between the two suction nozzles 120 is open to external air to allow unhindered air supply, which may be important if the sample 10 spans across both suction nozzles 120 during movement of the sample 10 past the suction nozzles 120.

In some embodiments the difference in height between a tall blade 250 and a short blade 260 may be approximately 1 mm. In some embodiments each suction nozzle 120 may have an opening of approximately 0.5-1.0 mm, resulting in an air (or gas) flow velocity of approximately 1-10 m/s when driven by a pressure difference from the vacuum chamber 170 of approximately 0.2-1.0 atm. In some embodiments the sample 10 may move laterally past (slide above) a suction nozzle 120 at approximately 5 mm/s or less and at a vertical distance of approximately 0.5-1.0 mm. A higher air (or gas) flow rate and a slower movement of the sample 10 may result in more residual resin 50 being sucked from the sample 10 per unit time, especially for resins 50 with viscosities greater than approximately 500 cP.

Figure 6A:
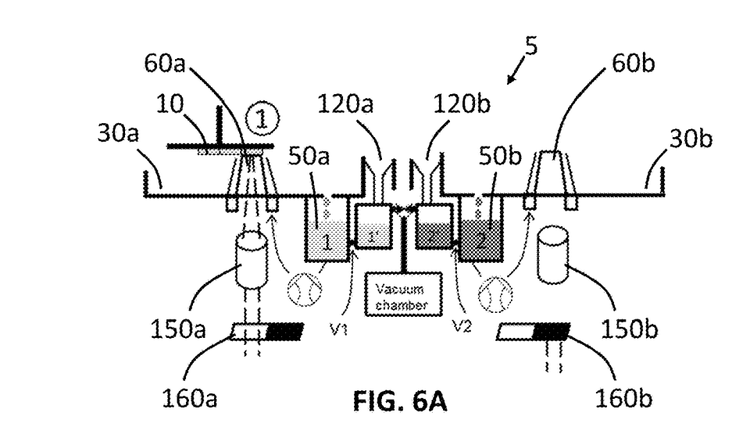
FIGS. 6A-6C show a schematic of a low-waste multi-material PμSL system at various stages during material switching.
Figure 6B:
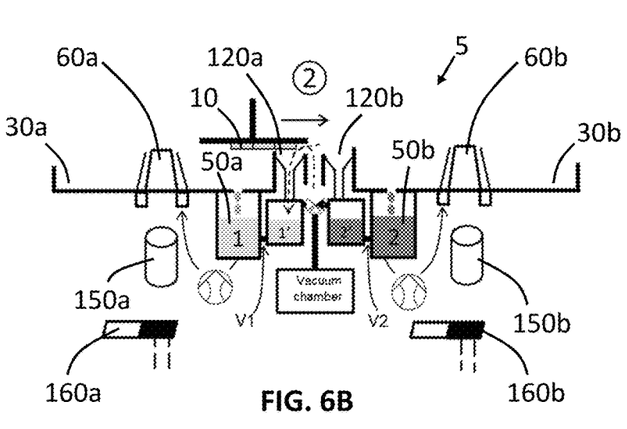
Figure 6C:
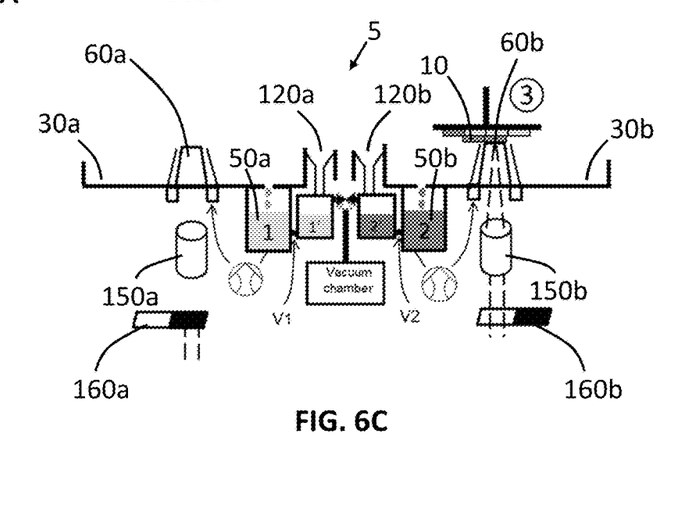

FIGS. 6A-6C show an exemplary multi-material printing sequence for the printing apparatus 5. FIG. 6A indicates an optical image being projected through an open first shutter 160*a*, through a first lens 150*a*, and onto the first printing head 60*a* adjacent to the sample 10. Excess resin 50*a* may be collected by a first vat 30*a*. FIG. 6B shows the sample 10 moving away from the first printing head 60*a* in preparation for printing with a second resin 50*b*. The sample 10 moves laterally past a first suction nozzle 120*a*, which sucks residual resin 50*a* from the sample 10. FIG. 6C indicates an optical image being projected through an open second shutter 160*b*, through a second lens 150*b*, and onto the second printing head 60*b* adjacent to the sample 10. Excess resin 50*b* may be collected by a second vat 30*b*.

While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular embodiments.

What is claimed is:

1. A 3-D printing system, comprising:
   at least one micro display chip coupled to a light source and adapted to display a digital image received from a computer;
   at least two printing heads, each disposed below a sample, above a respective one of at least two collection vats, and defining an upward-facing frustum comprising a flat, sealed, optically transparent, and gas-permeable window circumscribed by an ejection nozzle fluidically coupled to a respective collection vat;
   at least two lenses, each disposed below a respective window and adapted to focus the digital image onto a layer of resin coating a top surface of the respective window;
   at least two suction nozzles, each disposed below the sample, adjacent to a respective collection vat, fluidically coupled to the respective collection vat, and fluidically couplable to a vacuum source, wherein application of a vacuum to a respective suction nozzle effectuates a suction at an upward-facing opening thereof; and
   three precision stages adapted to move the sample, affixed to a sample platform, laterally (X and/or Y) and vertically (Z) relative to the at least two printing heads and laterally (X and/or Y) relative to the at least two suction nozzles.

2. The system of claim 1 wherein the opening of each suction nozzle is circumscribed by a rim having a tall edge opposite a short edge, the tall edge being adjacent to an individual one of the at least two collection vats to which the suction nozzle is fluidically coupled.

3. The system of claim 1 further comprising at least two suction reservoirs, each fluidically coupled to a respective suction nozzle and to a manifold that is fluidically coupled to the vacuum source, wherein the manifold diverts the application of the vacuum to a respective suction reservoir one at a time.

4. The system of claim 3 further comprising at least two storage reservoirs and at least two fluid pumps adapted to pump resin from a respective storage reservoir to a respective printing head, wherein each storage reservoir is disposed below a respective collection vat and fluidically coupled thereto via an orifice, and each storage reservoir is disposed adjacent to a respective suction reservoir and fluidically coupled thereto via a valve.

5. The system of claim 1 further comprising:
   at least two shutters, each adapted to selectively prohibit the digital image from reaching a respective lens;
   a beam splitter adapted to partially reflect the digital image towards a first shutter and to partially transmit the digital image towards a mirror as a partially transmitted digital image; and
   a mirror adapted to reflect the partially transmitted digital image towards a second shutter.

6. The system of claim 5 further comprising a charge coupled device (CCD) adapted to monitor the digital image focused by a respective one of the lenses, wherein the CCD is disposed on a side of the beam splitter opposite the respective lens.

7. The system of claim 1 wherein each collection vat is at least twice as long as the sample platform in a first lateral direction and at least twice as long as the sample platform in a second lateral direction.

\* \* \* \* \*